US006891840B2

United States Patent
Okada (10) Patent No.: US 6,891,840 B2
(45) Date of Patent: May 10, 2005

(54) LAN PATH CONTROL SYSTEM CAPABLE OF EASILY CHANGING ACTIVE PORT OF TERMINAL

(75) Inventor: Masaaki Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 868 days.

(21) Appl. No.: 09/883,228

(22) Filed: Jun. 19, 2001

(65) Prior Publication Data

US 2002/0018442 A1 Feb. 14, 2002

(30) Foreign Application Priority Data

Jun. 20, 2000 (JP) ........................................ 2000-184339

(51) Int. Cl.$^7$ .......................... H04L 12/28; G01R 31/08
(52) U.S. Cl. ...................... 370/401; 370/392; 370/222
(58) Field of Search ................................ 370/245, 254, 370/255, 258, 352, 395.52, 389, 392, 401, 403, 217–220, 222

(56) References Cited

U.S. PATENT DOCUMENTS

| | | | |
|---|---|---|---|
| 5,684,800 A | * 11/1997 | Dobbins et al. | 370/401 |
| 5,708,654 A | * 1/1998 | Arndt et al. | 370/242 |
| 5,910,955 A | * 6/1999 | Nishimura et al. | 370/401 |
| 5,963,540 A | * 10/1999 | Bhaskaran | 370/218 |
| 6,049,825 A | 4/2000 | Yamamoto | 709/221 |
| 6,088,356 A | * 7/2000 | Hendel et al. | 370/392 |
| 6,343,080 B1 | 1/2002 | Kondo | |
| 6,560,229 B1 | * 5/2003 | Kadambi et al. | 370/392 |
| 6,700,868 B2 | * 3/2004 | Smith et al. | 370/217 |

FOREIGN PATENT DOCUMENTS

| | | |
|---|---|---|
| JP | 61-295738 | 12/1986 |
| JP | 3-296344 | 12/1991 |
| JP | 9-102783 | 4/1997 |
| JP | 10-320327 | 12/1998 |
| JP | 11-168488 | 6/1999 |
| JP | 11-205356 | 7/1999 |

OTHER PUBLICATIONS

Article—An Open Solution to Fault–Tolerant Ethernet: Design, Prototyping, and Evaluation—J. Huang, et al.—pp. 461–469 (1999).

* cited by examiner

Primary Examiner—Phirin Sam
Assistant Examiner—Andrew Wahba
(74) Attorney, Agent, or Firm—Foley & Lardner LLP (57) ABSTRACT

In a local area network path control system, hubs are connected in a ring and classified into two groups. Each of terminals has two LAN controllers. One of LAN controllers is connected to one of the hubs belonging to one of the groups while the other is connected one of the hubs belonging to the other group. One of the LAN controller is used as an active controller and the other is used as a standby controller. Each of the terminals has a destination information table registering destination IP addresses and destination MAC addresses of the other terminals. When the terminal detects failure occurring between the active controller and the corresponding hub, it changes the active controller from one to the other of the two LAN controllers. Furthermore, the terminal notifies a newly MAC address for communicating with the terminal to the other terminals. Each of the other terminals rewrites the destination MAC address related to the terminal which notifies the newly MAC address of the destination information terminal.

12 Claims, 7 Drawing Sheets

| IP ADDRESS | MAC ADDRESS (ACTIVE LAN CONT.) |
|---|---|
| 10. 10. 10. 63 | ..... |
| 10. 10. 10. 127 | ..... |
| 10. 10. 10. 181 | ..... |
| 10. 10. 10. 253 | ..... |
| 10. 10. 20. 63 | ..... |
| ⋮ | ⋮ |

LAN PATH CONTROL SYSTEM CAPABLE OF EASILY CHANGING ACTIVE PORT OF TERMINAL

BACKGROUND OF THE INVENTION

This invention relates to a local area network (LAN) path control system and, in particular, to an LAN path control system including a plurality of terminals each of which has two ports, an active port and a standby port.

A conventional duplex LAN system has duplicated LAN transmission lines, which are independent of each other. One of the duplicated LAN transmission lines is used for an active LAN system and the other is used for a standby LAN system.

Moreover, the conventional duplex LAN system includes a plurality of terminals each of which has duplicated ports. One of the ports is connected to one of the duplicated LAN transmission lines as an active port while the other is connected to the other of the duplicated LAN transmission lines as a standby port.

When the active port of a certain terminal fails, the terminal activates the standby port instead of the failed port. In this case, the other terminals must activate their standby ports and inactivate their active ports, because the active transmission line and the standby transmission line are independent of each other. Therefore, complicated processes and a long time are necessary to change from the active LAN system to the standby LAN system.

An LAN path control system is proposed to eliminate the need to activate the standby ports instead of the normal active ports of terminals that are unrelated to the failure.

The LAN path control system is used for a duplex local area network system including terminals each of which has two ports. One of the ports is used as an active port while the other is used as a standby port. The ports are connected to either a transmission line or transmission lines connected to each other.

The terminals are distinguished from one another by specific interact protocol (IP) addresses assigned to them. Moreover, the ports of the terminals are distinguished from one another by specific media access control (MAC) addresses assigned to them. Each of the terminals has a network information table for registering the MAC addresses of the active ports of the other terminals. Each of the MAC addresses is related with the IP address of the corresponding terminal in the network information table.

Now, consideration is made about a case where a first terminal, one of the terminals, transmits a packet to a second terminal, another one of the terminals.

At first, the first terminal refers to the network information table for the IP address of the second terminal before it transmits the packet to the second terminal. IF the IP address of the second terminal is found in the network information table, the first terminal reads out the MAC address connected with the IP address of the second terminal from the network information table. Then the first terminal transmits the packet to the second terminal by using the MAC address read out from the network information table. On the other hand, the first terminal asks the other terminals about the MAC address of the second terminal when the IP address of the second terminal is not found in the network information table. IF a reply including the IP address and the MAC address of the second terminal is transmitted from the second terminal, the first terminal registers a combination of the IP address and the MAC address of the second terminal in the network information table. Then the first terminal transmits the packet by using the MAC address of the second terminal. After this, the first terminal uses the MAC address registered in the network information table whenever it transmits another packet to the second terminal.

Each of the terminals stores combinations of the IP addresses and the MAC addresses of the other terminals to which it transmits packets like the first terminal.

In the meantime, each of the terminals must activate the standby port instead of the active port when a failure occurs in a path passing through the active port. In consequence, the specific MAC address of the active port related to the failure can not be used because the standby port has the specific MAC address different from that assigned to the active port. Accordingly, each of the other terminals must rewrite the network information table about the MAC address of the active port related to the failure.

A proposed LAN path control system has a problem that a long time and a complex process are necessary for rewriting the network information tables of the terminals.

SUMMARY OF THE INVENTION

It is therefore an object of this invention to provide a local area network path controlling system which is capable of easy changing an active port of a terminal.

It is another object of this invention to provide a terminal which is used in a local area network and capable of easy changing from an active port to a standby port thereof.

It is still another object of this invention to provide a method of controlling a local area network path which is capable of easy changing an active port of a terminal.

Other object of this invention will become clear as the description proceeds.

On describing the gist of an aspect of this invention, it is possible to understand that a local area network path control system has a plurality of terminals and a plurality of hubs forming a simplex basic local area network. Each of the terminals has first and second local area network controllers and assigned with specific internet protocol address. The first local area network controller is directly connected to one of the hubs and assigned with first specific media access control address. The second local area network controller is directly connected to another one of the hubs and assigned with second specific media access control address. Either of the first local area network controller or the second local area network controller is put in service and serves as an active controller. The first specific media access control address is used for an active media access control address when the first local area network controller is the active controller. The second specific media access control address is used for the active media access control address when the second local area network controller is the active controller.

According to a first aspect of this invention, each of the terminals comprises a first table for registering the specific internet protocol address, the first and the second specific media access control addresses and operation information indicating which the first and the second local area network controllers is put in service. A first broadcasting portion is for broadcasting an address notification formed on the basis of registrations of the first table onto the simplex basic local area network when starting is carried out. The address notification includes the specific internet protocol address as a source internet protocol address, and said active media access control address as a source media access control address. A replying portion is for replying to another address notification transmitted through the simplex basic local area network. The replying portion transmits a reply including the specific internet protocol address as the source internet protocol address and the active media access control addresses as the source media access control address to a source terminal of the other address notification through the simplex basic local area network. A second table is for registering the source internet protocol address and the source media access control address included in each of the other address notification and another reply transmitted through the simplex basic local area network. A registering portion is for abstracting the source internet protocol address and the source media access control address from each of the other address notification and the other reply to register them into the second table. A first failure detecting portion is for detecting link failure between the active controller and the one of the hubs to which the active controller directly connected. A changing portion is for changing the active controller between the fist local area network controller and the second local area network controller and for rewriting the operation information registered in the first table so that the operating controller indicated by the operation information is changed from one to the other of the first and the second local area network controllers when the first failure detecting portion detects the link failure. A second broadcasting portion is for broadcasting a changing notification onto the simplex basic local area network when the changing portion changes the active controller. The changing notification includes the specific internet protocol address as the source internet address and the active media access control address. A rewriting portion is for rewriting the second table about the only source media access control address in response to another changing notification transmitted through the simplex basic local area network.

According to another aspect of this invention, a terminal is used in a local area network system having a plurality of hubs forming a simplex basic local area network. The terminal has first and second local area network controllers and is assigned with specific internet protocol address. The first local area network controller is directly connected to one of the hubs and assigned with first specific media access control address. The second local area network controller is directly connected to another one of the hubs and assigned with second specific media access control address. Either of the first local area network controller or the second local area network controller is put in service and serves as an active controller. The first specific media access control address is used for an active media access control address when the first local area network controller is the active controller. The second specific media access control address is used for the active media access control address when the second local area network controller is the active controller. A first table is for registering the specific internet protocol address, said first and said second specific media access control addresses and operation information indicating which the first and the second local area network controllers is put in service. A first broadcasting portion is for broadcasting an address notification formed on the basis of registrations of the first table onto the simplex basic local area network when starting is carried out. THe address notification includes the specific internet protocol address as a source internet protocol address, and the active media access control address as a source media access control address. A replying portion is for replying to another address notification transmitted through the simplex basic local area network. The replying portion transmits a reply including the specific internet protocol address as the source internet protocol address and the active media access control addresses as the source media access control address to a source terminal of the other address notification through the simplex basic local area network. A second table is for registering the source internet protocol address and the source media access control address included in each of the other address notification and another reply transmitted through the simplex basic local area network. A registering portion is for abstracting the source internet protocol address and the source media access control address from each of the other address notification and the other reply to register them into the second table. A first failure detecting portion is for detecting link failure between the active controller and the one of the hubs to which the active controller directly connected. A changing portion is for changing the active controller between the fist local area network controller and the second local area network controller and for rewriting the operation information registered in the first table so that the operating controller indicated by the operation information is changed from one to the other of the first and the second local area network controllers when the first failure detecting portion detects the link failure. A second broadcasting portion is for broadcasting a changing notification onto the simplex basic local area network when the changing portion changes the active controller. The changing notification includes the specific internet protocol address as the source internet address and the active media access control address. A rewriting portion is for rewriting the second table about the only source media access control address in response to another changing notification transmitted through the simplex basic local area network.

According to still another aspect of this invention, a method of controlling a path formed in a local area network having a plurality of terminals and a plurality of hubs forming a simplex basic local area network. Each of the terminals has first and second local area network controllers and is assigned with specific internet protocol address. The first local area network controller is directly connected to one of the hubs and assigned with first specific media access control address. The second local area network controller is directly connected to another one of the hubs and assigned with second specific media access control address. Either of the first local area network controller or the second local area network is put in service and serves as an active controller. The first specific media access control address is used for an active media access control address when the first local area network controller is the active controller. The second specific media access control address is used for the active media access control address when the second local area network controller is the active controller. The method comprises the steps of registering, in a first table, the specific internet protocol address, the first and the second specific media access control addresses and operation information indicating which the first and the second local area network controllers is put in service, broadcasting, from a first broadcasting portion, an address notification formed on the basis of registrations of the first table onto the simplex basic local area network when starting is carried out, the address notification including the specific internet protocol address as a source internet protocol address, and the active media access control address as a source media access control address, replying, at a replying portion, to another address notification transmitted through the simplex basic local area network, the replying portion transmitting a reply including the specific internet protocol address as the source internet protocol address and the active media access control addresses as the source media access control address to a source terminal of the other address notification through the simplex basic local area network, abstracting, at a registering portion, abstracting the source internet protocol address and the source media access control address from each of the other address notification and another reply transmitted through the simplex basic local area network, registering, in a second table, the source internet protocol address and the source media access control address abstracted from each of the other address notification and the other reply, detecting, at a first failure detecting portion, link failure between the active controller and the one of the hubs to which the active controller directly connected, changing, at a changing portion, the active controller between the fist local area network controller and the second local area network controller, rewriting, at the changing portion, the operation information registered in the first table so that the operating controller indicated by the operation information is changed from one to the other of the first and the second local area network controllers when the first failure detecting portion detects the link failure, broadcasting, from a second broadcasting portion, a changing notification onto the simplex basic local area network when the changing portion changes the active controller, the changing notification including the specific internet protocol address as the source internet address and the active media access control address, and rewriting, at a rewriting portion, the second table about only the source media access control address in response to another changing notification transmitted through the simplex basic local area network.

DESCRIPTION OF THE PREFERRED EMBODIMENT

Figure 1:
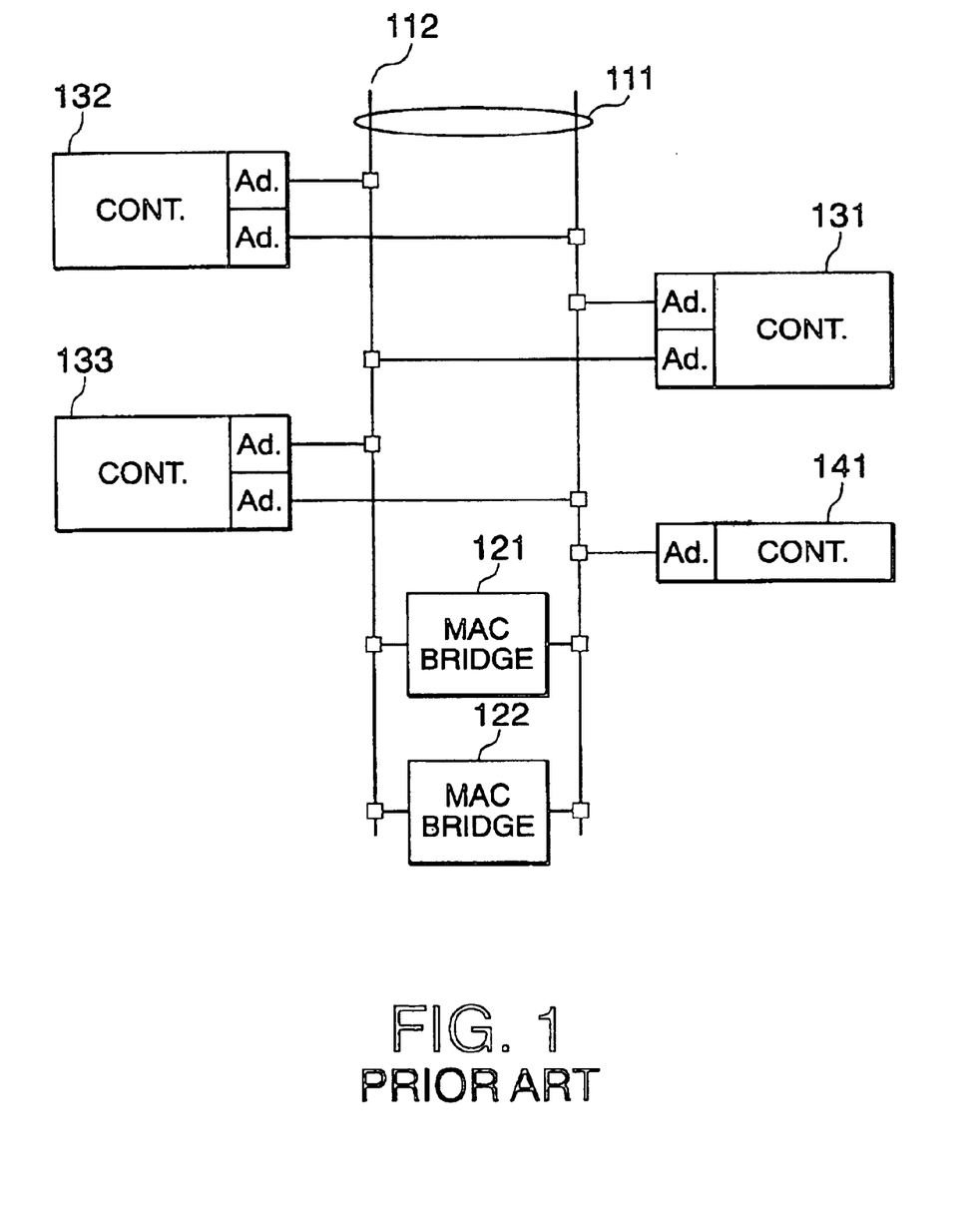
FIG. 1 is a schematic view of a related local area network path control system.

Referring to FIG. 1, description will be at first directed to a related local area network (LAN) path control system for a better understanding of this invention. The related LAN path control system is disclosed in Japanese Unexamined Patent Publication No. Hei3-296344.

In FIG. 1, the related LAN path control system comprises LAN transmission lines 111 and 112 duplicated each other. Media access control (MAC) bridges 121 and 122 are connected between the transmission lines 111 and 112. Duplex terminals 131, 132 and 133 are connected to both of the transmission lines 111 and 112 while a simplex or normal terminal 141 is connected to the transmission line 111.

Each of the duplex terminals 131, 132 and 133 has duplicated adapters and a controller. One of the adapters is connected to the transmission line 111 and used as an active adapter while the other is connected to the transmission line 112 and used as a standby adapter.

The simplex terminal 141 has an adapter connected to the transmission line 111 and a controller.

The MAC bridges 121 and 122 have the same structure. The MAC bridges 121 is used as an active equipment while the MAC brides 122 is used as a standby equipment. Hereinafter the description will be made about the MAC bridge 121.

The MAC bridge 121 has a route information table for registering information of relationships among source MAC addresses, destination MAC addresses and LANs or transmission lines. When a packet is received, the MAC bridge 121 abstracts a source MAC address and a destination MAC address from the packet. If the abstracted source and destination MAC addresses are already registered in the route information table, the MAC bridge 121 transmits the packet to the LAN expressed by the information registered in the route information table. When the abstracted source and destination MAC addresses are not registered in the route information table yet, the MAC bridge 121 finds a route for a terminal to which the destination MAC address is assigned. To find the route, the MAC bridge 121 carries out a spanning tree routing function. The MAC bridge 121 register the found route in the route information table together with the source MAC address and the destination MAC address.

With this structure, the LAN path control system enables the simplex terminal 141 to communicate with the duplex terminals 132, 133 and 134 even though the active adapters of the duplex terminal 132, 133 and 134 fail. Furthermore, the LAN path control system enables the simplex terminal 141 to communicate with another terminal (not shown) connected to the transmission line 112 only. In addition, the duplex terminals 132, 133 and 134 can communicate with one another even if the active adapters fail.

However, nothing is made about changing the active adapter between the two adapters at each duplex terminal 132, 133 or 134 in the above-mentioned Publication. In particular, though each of the duplex terminals requires a network information table for registering combinations of internet protocol (IP) addresses and MAC addresses, the network information table is not explain in the above-mentioned Publication at all.

Figure 2:
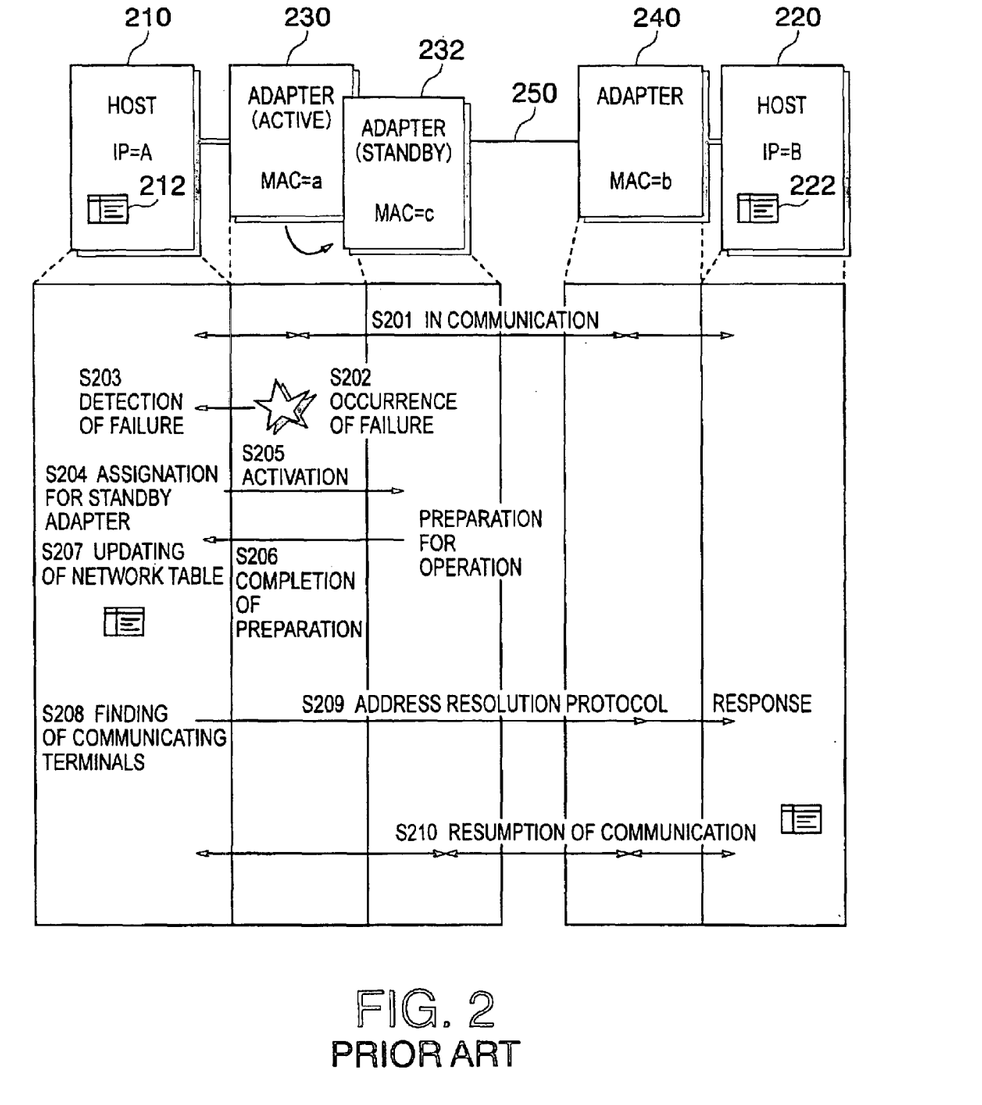
FIG. 2 is a schematic view of another related local area network path control system.

Referring to FIG. 2, another related LAN path control system will be explained in the following. The related LAN path control system is disclosed in Japanese Unexamined Patent Publication No. Tokkai Hei 10-320327.

In FIG. 2, the related LAN path control system comprises host computers 210 and 220 and communications adapters 230, 232 and 240. The host computer 210 is connected to both of the communications adapters 230 and 232 while the host computer 220 is connected to the communications adapters 240. Both of the communications adapters 230 and 232 are connected to the communications adapter 240 through a network 250. The communications adapter 230 is used as an active adapter while the communications adapter 232 is used as a standby adapter. The host computers 210 and 220 have network tables 212 and 222, respectively.

The host computers 210 and 220 are assigned with IP addresses IP=A and IP=B, respectively. The communications adapters 230, 232 and 240 are assigned with MAC addresses MAC=a, MAC=c and MAC=b, respectively.

Now, it is assumed that the host computers 210 and 220 communicate with each other through the communication adapter 230, the network 250 and the communication adapter 240 (Step S201). In this situation, the host computer 210 registers the MAC address MAC=a as a source MAC address, the MAC address MAC=b as a destination MAC address, and the IP address IP=B as a destination host computer in the network table 212. Similarly, the host computer 220 registers the MAC address MAC=b as a source MAC address, the MAC address MAC=a as a destination MAC address, and the IP address IP=A as a destination host computer in the network table 222.

If a failure occurs in the communications adapter 230 (Step S202), the host computer 210 detects the failure of the communications adapter 230 (Step S203). When the failure of the communication adapter 230 is detected, the host computer 210 decides to assign the work of the communications adapter 230 to the communications adapter 232 (Step S204). Then the host computer 210 commands the communication adapter 232 to operate (Step S205).

When the command of the operation is received, the communication adapter 232 prepares an operation and sends a notice of completion to the host computer 210 (Step S206).

When the host computer 210 receives the notice of completion sent from the standby adapter 232, it updates the network table 212 (Step S207). That is, the host computer 210 changes the source MAC address of the network table 212 from MAC=a to MAC=c. Furthermore, the host computer 210 finds the other host computer(s) which communicates with the host computer 210 when the failure occurs in the communications adapter 230 (step S208). Hereupon the other host computer is the host computer 220. Then, the host computer 210 sends an address resolution protocol (ARP) response to the host computer 220 (step S209) The ARP response informs the host computer 220 that the active adapter is changed from the communication adapter 230 to the communication adapter 232.

When the ARP response is received, the host computer 220 rewrites the network table 222. That is, the host computer 220 changes the destination MAC address of the network table 222 from the MAC address MAC=a to the MAC address MAC=c in response to the ARP response.

Thus, the related LAN path control system of FIG. 2 inactivates the failing adapter and activates the standby adapter instead of the failing adapter at the terminal related to the failure. It is unnecessary to change from an active adapter to a standby adapter in each of the other host computers unrelated to the failure.

However, each of the other host computers unrelated to the failure can not know that the active adapter is changed form one to the other of two adapters at the terminal related to the failure.

In addition, the related LAN path control system of FIG. 2 can not meet failure of the network 250 because both of the active adapter and the standby adapter are connected to the network 250.

Referring to FIGS. 3 through 7, the description will proceed to a local area network (LAN) path control system according to a preferred embodiment of this invention.

Figure 3:
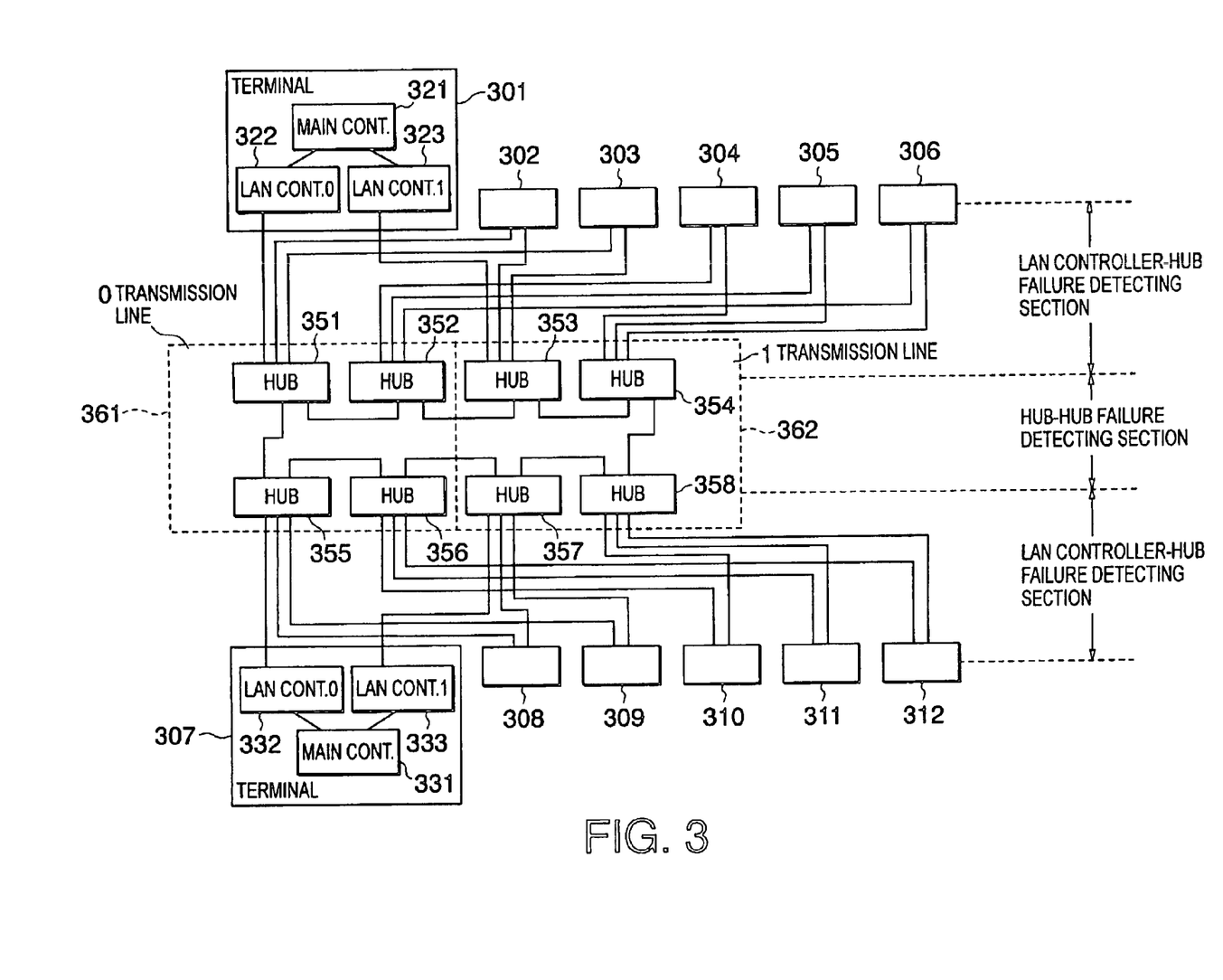
FIG. 3 is a block diagram of a local area network path control system according to a preferred embodiment of this invention.

In FIG. 3, the LAN path control system comprises a plurality of terminals 301–312 and a plurality of hubs 351–358, concentrators.

The hubs 351–358 are connected in a ring to form a simplex basic local area network with a ring structure. The hubs 351–358 are classified into first and second groups to raise reliablity of the simplex basic local area network. The hubs 351, 352, 355 and 356 belonging to the first group are used for a 0-transmission line 361 while the remaining hubs 353, 354, 357 and 358 belonging to the second group are used for an 1-transmission line 362.

Each of the terminals 301–312 has a main controller and two LAN controllers which have LAN communication ports (not shown) respectively. In each terminal, one of the LAN controllers is connected to one of the hubs belonging to the first group through one of the LAN communication ports while the other LAN controller is connected to one of hubs belonging to the second group through the other LAN communication port. For example, the terminal 301 has the main controller 321 and the LAN controllers 322 and 323 connected to the hubs 351 and 353 respectively. Moreover, the terminal 307 has the main controller 331 and the LAN controllers 332 and 333 connected to the hubs 355 and 357 respectively. Because all of the terminals are connected to both of the 0-transmition line and the 1-transmition line, each of the terminals can communicate with any one or more of the other terminals even though one of the hubs fail. Therefore, the LAN path control system has high reliability.

Each of the terminals is assigned with a specific internet protocol (IP) address. Furthermore, each of the LAN controllers is assigned with a specific media access control (MAC) address. In other words, each terminal has one of the specific IP address and two of the MAC addresses.

Referring to FIGS. 4 to 7, the description is made about the terminal 301 in more detail. Additionally, each of the terminals 302–312 has the same structure as the terminal 301.

Figure 4:
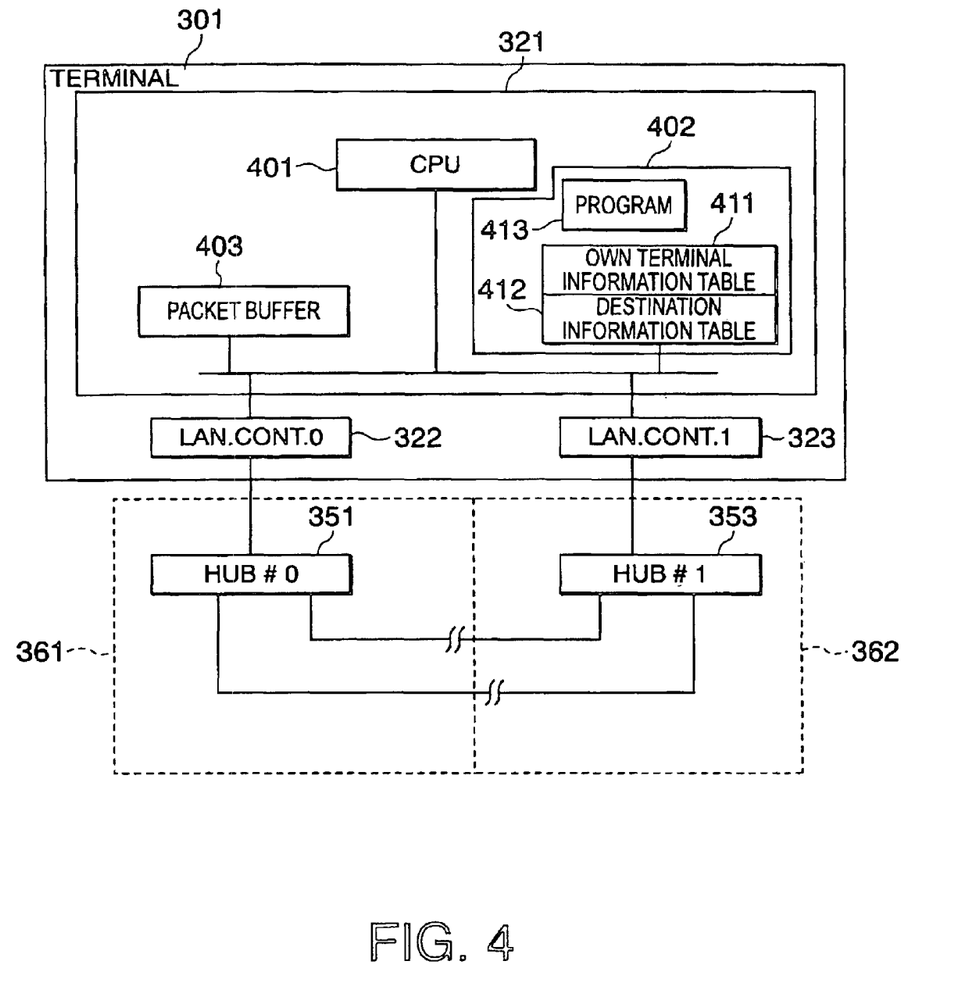
FIG. 4 is a block diagram of a terminal used in the local area network path control system of FIG. 3.

In FIG. 4, the main controller 321 comprises a central processing unit (CPU) 401, a memory 402 and a packet buffer 403, The memory 402 has an own terminal information table 411, a destination information table 412 and a program memorizing area 413.

The packet buffer 403 is for memorizing transmission data.

Figure 5:
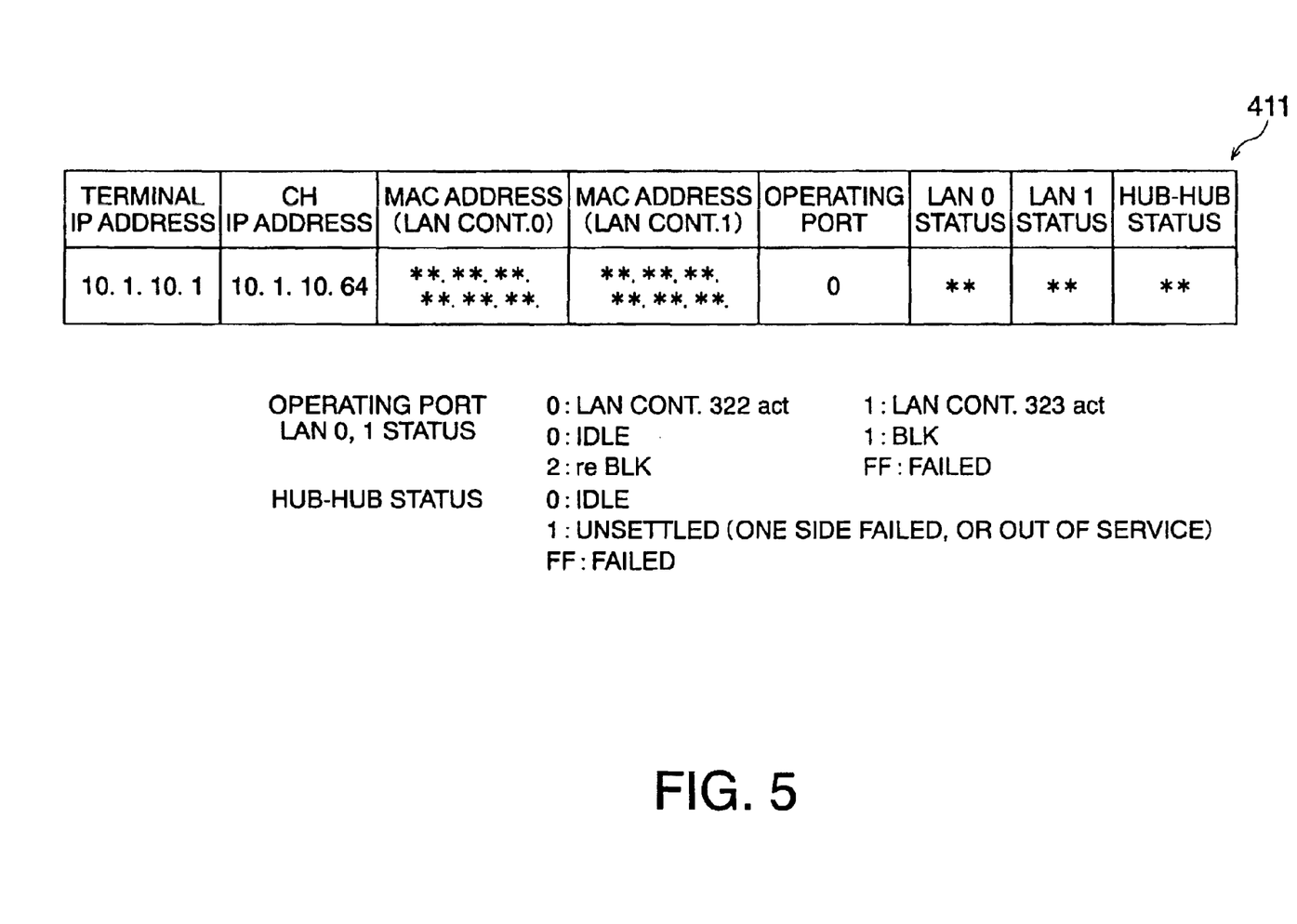
FIG. 5 shows a format of an own terminal information table provided in the memory used in terminal of FIG. 4.

The own terminal information table 411 is formed as shown in FIG. 5. That is, the own terminal information table 411 has a terminal IP address area for registering the specific IP address assigned to the terminal 301. A channel (CH) IP address area is for registering a channel IP address assigned to the terminal 301. First and second MAC address areas are for registering the specific MAC addresses assigned to the LAN controllers 322 and 323 respectively. An operating port area is for registering a flag indicating which the LAN controller 322 or 323 is an active controller. A first LAN controller-hub (i.e. LAN0) status area is for registering status between the LAN controllers 322 and the hub 351. A second LAN controller-hub (i.e. LAN1) status area is for registering status between the LAN controllers 323 and the hub 353. A hub-hub status area is registering status between the hubs 351 and 353. In the terminal IP address area and the first and the second MAC address areas, the specific IP address assigned to the terminal 301 and the MAC addresses assigned to LAN controller 322 and 323 are previously registered respectively when the terminal is initialized.

Figure 6:
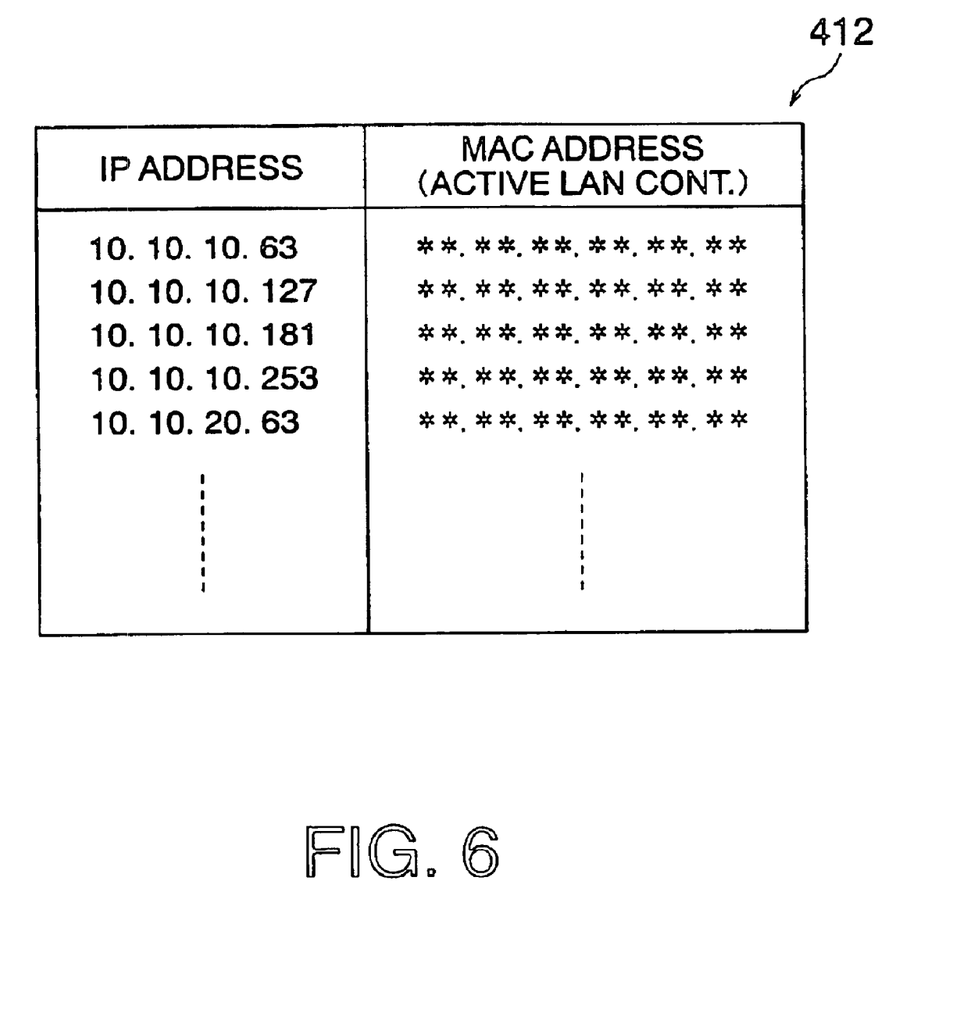
FIG. 6 shows a format of a destination terminal information table provided in the memory used in terminal of FIG. 4.

The destination information table 412 is formed as shown in FIG. 6. That is, the destination information table 412 has a destination IP address area and a destination MAC address area. The destination IP address area is for registering the specific IP addresses of the other terminals 302–312 as destination IP addresses. The destination MAC address area is for registering the specific MAC addresses of the active controllers of the other terminals 302–312 as destination MAC addresses. The specific IP addresses of the other terminals 302–312 and the specific MAC addresses of the other terminals 302–312 are registered in the destination information table 412 when they are transmitted from the other terminals 302–312. Accordingly, if a certain terminal is out of operation, its specific IP address and its specific MAC address are not registered in the destination information table 412 because they can not be received. Thus, the number of the specific IP addresses registered in the destination information table 412 is equal to the number of the terminals with which the terminal 301 can communicate.

The program memorizing area 413 memorizes a program necessary for the CPU 401 to control the whole of the terminal 301. The program makes the CPU 401 serve as an equipment illustrated in FIG. 7.

Figure 7:
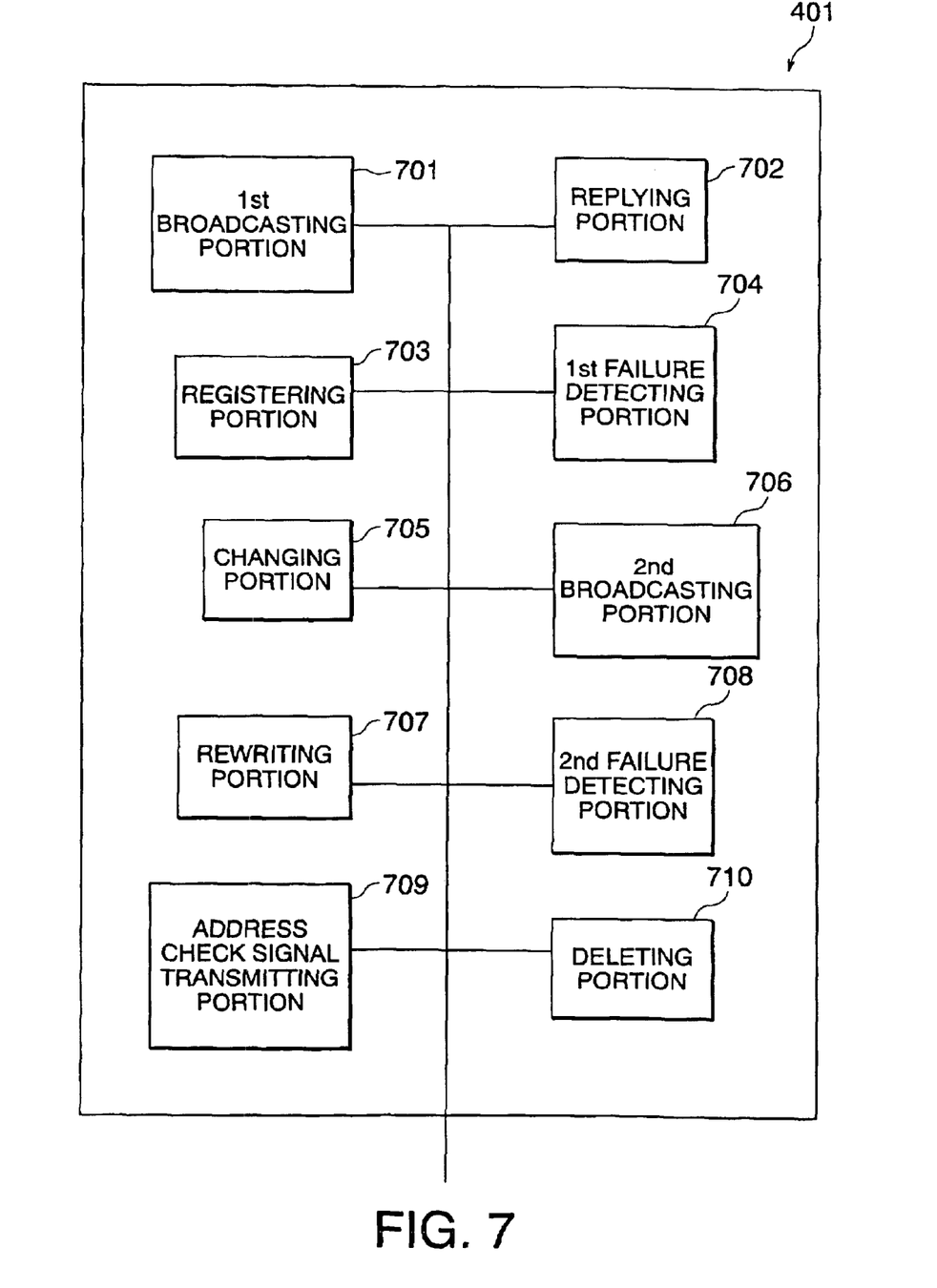
FIG. 7 is a functional block diagram of a central processing unit used in the terminal of FIG. 4.

In FIG. 7, the equipment comprises a first broadcasting portion 701 which broadcasts an address notification formed on the basis of registrations of the own terminal information table 411 onto the simplex basic local area network. A replying portion 702 replies to a received address notification transmitted from any one of the other terminals 302–312 through the simplex basic local area network. A registering portion 703 abstracts the source internet protocol address and the source media access control address each of the received address notification and a received reply transmitted form any one of the terminals 302–312. The registering portion 703 registers the abstracted source internet protocol address and the abstracted source media access control address into the destination information table 412. A first failure detecting portion 704 detects a link failure between the active controller 322 and the hub connected to the active controller. A changing portion 705 changes the active controller from the LAN controller 322 to the LAN controller 323 (or the LAN controller 323 to the LAN controller 322). The changing potion 705 rewrites the operation port area of the own terminal information table 411 when the first failure detecting portion 704 detects the link failure. A second broadcasting portion 706 broadcasts a changing notification onto the simplex basic local area network when the changing portion 705 changes the active controller. A rewriting portion 707 rewrites the destination information table when it receives another changing notification transmitted from any one of the terminals 302–312 through the simplex basic local area network. A second failure detecting portion 708 transmits a local area network check signal from a standby controller to the active controller through the simplex basic local area network to detect a failure between two hubs 351 and 353. Additionally, the LAN controller 323 is the standby controller when the LAN controller 322 is the active controller. When the LAN controller 323 is the active controller, the LAN controller 322 is the standby controller. An address check signal transmitting portion 709 transmits an address check signal on the basis of registrations of the destination information table. A deleting portion 710 deletes the combination of the source internet protocol address and the source media access control address from the destination information table 412 when a response is not obtained by elapse of a predetermined time.

An operation of the LAN path control system will be described in below.

The CPU 401 controls the whole of the terminal 301. For instance, the CPU 401 carries out controlling of the LAN controller 322 and 323, transmitting/receiving of terminal-terminal control data signals, watching between the LAN controller 322 and 323 via the simplex basic LAN to detect a failure.

The active controller transmits signals onto the simplex basic LAN according as directions of the CPU 401.

Moreover, the active controller receives signals each of which include the MAC address of the active controller as the destination address or which is broadcast. IN addition, the LAN controller 322 watches between it and the hub 351 to detect a failure under the control of the CPU 401. Similarly, the LAN controller 323 watches between it and the hub 353 to detect a failure under the control of the CPU 401. Moreover, the LAN controllers 322 and 323 watches between the hubs 351 and 353 in cooperation with each other to detect a failure under the control of the CPU 401.

When the terminal 301 is started up, the CPU 401 checks the MAC addresses registered in the own terminal information table. IF at least one of the MAC address is injustice (e.g. "00.00.00,00.00.00" or "FF.FF.FF.FF.FF.FF"), the CPU 401 displays the effect that the terminal 301 is a reject on a display (not shown).

Next, the CPU 401 (or the first broadcasting portion 701) read out the specific IP address and the specific MAC address of the active controller (e.g. the LAN controller 322) from the own terminal information table. Then the CPU 401 forms the address notification which includes the read out specific IP address as a source IP address and the read out specific MAC address as a source MAC address. The address notification is broadcast onto the simplex basic LAN though the active controller (i.e. the LAN controller 322).

After the address notification is broadcast from the controller 322, the CPU 401 waits replies transmitted from the other terminals 302–312 until a predetermined time (e.g. 2 sec) elapses. The CPU 401 merely deals with the replies by elapse of the predetermined time. The dealing operation for the replies will be described later.

Each of the other terminals 302–312 broadcasts another address notification including both of its specific IP address and its specific MAC address like the terminal 301 when it is started up.

When the CPU 401 (or the replying portion 702) receives the other address notification broadcast from any one of the other terminals 302–312, it (or the registering portion 703) abstracts the source IP address and the source MAC address from the received address notification. Then the CPU 401 (or the registering portion 703) compares the abstracted IP address with the specific IP address registered in the own terminal information table 411. Moreover, the CPU 401 compares the abstracted MAC address with both of the specific MAC addresses registered in the own terminal information table 411. When the abstracted IP address is coincide with the specific IP address and/or the abstracted MAC address is coincide with one of the specific MAC addresses, the CPU 401 (or the replying portion 702) transmits a duplicate notification (or NG notification) to a source terminal which transmits the other address notification as the reply. The duplicate notification includes the abstracted IP address as a destination IP address and the abstracted MAC address as a destination MAC address.

On the other hand, when the abstracted IP address is not coincide with the specific IP address and the abstracted MAC address is not coincide with each of the specific MAC addresses, the CPU 401 (or the replying portion 702) transmits a normal reply as the reply. The normal reply includes the specific IP address of the terminal 301 as the source IP address and the specific MAC address of the active controller 322 as the source MAC address. Furthermore, the CPU 401 (or the registering portion 703) registers the abstracted IP address and the abstracted MAC address in the destination information table 412 as one of the destination IP addresses and one of the destination MAC addresses.

Because the abstracted MAC address is connected with the abstracted IP address in the destination information table 412, the MAC address can be retrieved by the use of the abstracted IP address.

Now, the above-mentioned dealing operation will be described in below.

When the CPU 401 receives the duplicate notification, it displays the effect that the terminal 301 is the reject on the display.

When the CPU 401 receives the normal reply, it abstracts the source IP address and the source MAC address from the received normal reply. Then, the CPU 401 registers the abstracted IF address and the abstracted MAC address in the destination information table 412 as one of the destination IP addresses and one of the destination MAC addresses.

Thus, the terminal 301 has the specific IP addresses and the MAC addresses of the other terminals which are put in operation in the destination information table 412. The terminal 301 can communicate with the other terminals by the use of the specific IP addresses and the MAC addresses registered in the destination information table 412.

During the terminal 301 is put in operation, the CPU 401 periodically carries out three inspections. A first inspection is detection of a link failure between the active controller and the hub connected to the active controller. A second inspection is detection of a failure between the hubs 351 and 353. A third inspection is confirmation of the destination IP addresses and the destination MAC addresses registered in the destination information table.

In the first inspection, the CPU 401 (or the first failure detecting portion 704) detects whether the physical line or cable connects the active controller to the hub corresponding to the active controller or not. A state that the physical line connects the active controller to the hub corresponding to the active controller is called a linked state. A state that the physical line does not connect the active controller to the hub corresponding to the active controller is called a link failed state.

Concretely, each of the hubs 351–358 periodically produces a detection bit signal and transmits the detection bit signal towards the terminal 301–312. Each of the LAN controllers has a firmware for monitoring the detecting bit signal and informs the CPU that it can not receive the detection bit signal for a predetermined time. In the terminal 301, the LAN controllers 322 and the 323 monitor the detection bit signals transmitted from hubs 351 and 353 respectively. When the active controller informs the CPU 401 that it can not receive the detection bit signal for the predetermined time, the CPU 401 (or the changing portion 705) activates the standby controller. That is, the CPU 401 changes the active controller from the LAN controller 322 to the LAN controller 323 when the active controller is the LAN controller 322. Contrary, when the active controller is the LAN controller 323, the CPU 401 changes the active controller from the LAN controller 323 to the LAN controller 322. When the standby controller informs the CPU 401 that it can not receive the detection bit signal for the predetermined time, the CPU 401 displays the effect that the link failed state occurs between the standby terminal and the hub corresponding to the standby terminal.

When the active controller is changed from one to the other of the LAN controller 322 and 323, the CPU 401 (or the changing portion 705) rewrites the operation port area of the own terminal information table 411. In addition, the CPU 401 (or the second broadcasting portion 706) broadcast the changing notification onto the simplex basic LAN through the newly active terminal. The changing notification includes the specific IP address of the terminal 301 as the source IP address and the specific MAC address of the newly active controller of the terminal 301 as the source MAC address.

Similarly, each of the other terminal 302–312 broadcasts another changing notification including its specific IP address and its specific MAC address onto the simples basic LAN when a failure occurs between the active controller and the corresponding hub.

When the CPU 401 receives the other changing notification broadcast from any one of the other terminals 302–312, it (or the rewriting portion 707) rewrites the destination information table. That is, the CPU 401 abstracts the source IP address and the source MAC address from the received changing notification broadcast. Next, by the use of the abstracted source IP address, the CPU 401 retrieve the destination IP address which is coincide with the abstracted source IP address from the destination information table. Then the CPU 401 registers the abstracted MAC address in the destination information table 412 as a newly destination MAC address instead of the former destination MAC address related with the retrieved destination IP address. The remaining destination MAC addresses, which are unrelated to the abstracted IP address, in the destination information table 412 are not rewritten. Accordingly, the rewriting does not affect communications between the terminal 301 and the other terminals (or pathes) unrelated to the link failed state. In addition, the rewriting is finished in a short time. In other words, the path is changed in a short time.

Similarly, when each of the other terminal 302–312 receives the changing notification, each destination information table is rewritten.

For the second inspection, the CPU 401 (or the second failure detecting portion 708) periodically transmits the LAN check signal towards the active controller through the Simplex LAN. The LAN check signal includes the specific IP address of the terminal as the destination IP address and the specific MAC address of the active controller of the terminal 301 as the destination MAC address. The CPU 401 judges that the failure occurs between the hub 351 and hub 353 when the LAN check signal can not receives for a predetermined time.

For the third inspection, the CPU 401 (or the address check signal transmitting portion 709) periodically selects one of the combinations of the destination IP addresses and the destination MAC addresses in order. The CPU 401 transmits the address check signal including the selected IP address as the destination IP address, the selected MAC address as the destination MAC address, the specific IP address of the terminal 301 as the source IP address, and the specific MAC address of the active controller of the terminal 301 as the source MAC address. The CPU 401 waits a response from the destination terminal corresponding to the selected IP address.

Similarly, each of the other terminals periodically transmits another address check signal and wait a response.

When the CPU 401 receives the other address check signal, it abstracts the source IP address and the source MAC address from the received address check signal. If both of the abstracted IP address and the abstracted MAC address coincide with one of combinations of the destination IP addresses and the destination MAC addresses registered in the destination information table 412, the CPU 401 transmits an identification response to the source terminal. On the other hand, when both of the abstracted IP address and the abstracted MAC address does not coincide with one of combinations of the destination IP addresses and the destination addressed registered in the destination information table 412, the CPU 401 does nothing.

Similarly, each of the other terminals transmits another identification response to the terminal in response to the address check signal transmitted by the terminal 301.

When the other identification response does not received for a predetermined time, the CPU 401 (or the deleting portion 710) deletes the selected IP address and the selected MAC address from the destination information table 412.

While this invention has thus far been described in conjunction with the preferred embodiment thereof, it will readily be possible for those skilled in the art to put this invention into practice in various other manners. For example, the hubs 351–358 may be connected in any order though the hubs belonging each groups are connected in series in FIG. 2.

What is claimed is:

1. A local area network path control system having a plurality of terminals and a plurality of hubs forming a simplex basic local area network, each of said terminals having first and second local area network controllers and assigned with specific internet protocol address, said first local area network controller directly connected to one of said hubs and assigned with first specific media access control address, said second local area network controller directly connected to another one of said hubs and assigned with second specific media access control address, either of said first local are a network controller or said second local area network controller put in service and serving as an active controller, said first specific media access control address used for an active media access control address when said first local area network controller is said active controller, said second specific media access control address used for said active media access control address when said second local area network controller is said active controller, wherein each of said terminals comprising:

a first table for registering said specific internet protocol address, said first and said second specific media access control addresses and operation information indicating which said first and said second local area network controllers is put in service, a first broadcasting portion for broadcasting an address notification formed on the basis of registrations of said first table onto said simplex basic local area network when starting is carried out, said address notification including said specific internet protocol address as a source internet protocol address, and said active media access control address as a source media access control address, a replying portion for replying to another address notification transmitted through said simplex basic local area network, said replying portion transmitting a reply including said specific internet protocol address as said source internet protocol address and said active media access control addresses as said source media access control address to a source terminal of the other address notification through said simplex basic local area network, a second table for registering said source internet protocol address and said source media access control address included in each of the other address notification and another reply transmitted through said simplex basic local area network, a registering portion for abstracting said source internet protocol address and said source media access control address from each of the other address notification and the other reply to register them into said second table, a first failure detecting portion for detecting link failure between said active controller and the one of said hubs to which said active controller directly connected, a changing portion for changing said active controller between said fist local area network controller and said second local area network controller and for rewriting said operation information registered in said first table so that said operating controller indicated by said operation information is changed from one to the other of said first and said second local area network controllers when said first failure detecting portion detects said link failure, a second broadcasting portion for broadcasting a changing notification onto said simplex basic local area network when said changing portion changes said active controller, said changing notification including said specific internet protocol address as said source internet address and said active media access control address, and a rewriting portion for rewriting said second table about only said source media access control address in response to another changing notification transmitted through said simplex basic local area network.

2. A local area network path control system as claimed in claim 1, each of said terminals further comprising:

a second failure detecting portion for transmitting a local area network check signal from one of said first and said second local area network controllers to the other of said first and said second local area network controllers through said simplex basic local area network to detect a failure between two hubs directly connected to said first and said second local area network controllers respectively.

3. A local area network path control system as claimed in claim 1, each of said terminals further comprising:

an address check signal transmitting portion for transmitting an address check signal using one of combinations of said source internet protocol address and said source media access control address registered in said second table onto said simplex basic local area network to obtain a response through said simplex basic local area network, a deleting portion for deleting the combination of said source internet protocol address and said source media access control address from said second table when said response is not obtained through said simplex basic local area network by elapse of a predetermined time.

4. A local area network path control system as claimed in claim 1, said hubs connected in a ring and classified into two groups, wherein said first local area network controller is connected to one of hubs belonging one of said groups while said second local area network controller is connected to one of hubs belonging the other of said groups.

5. A local area network path control system as claimed in claim 1, wherein said replying portion compare said source internet protocol address and said source media access control address included in the other address notification with said specific internet protocol address and each of said first and said second media access control addresses, respectively, to transmit a duplicate notification instead of said address notification when said source internet protocol address coincides with said specific internet protocol address or when said source media access control address coincides with one of said first and said second media access control addresses.

6. A terminal used in a local area network system having a plurality of hubs forming a simplex basic local area network, said terminal having first and second local area network controllers and assigned with specific internet protocol address, said first local area network controller directly connected to one of said hubs and assigned with first specific media access control address, said second local area network controller directly connected to another one of said hubs and assigned with second specific media access control address, either of said first local area network controller or said second local area network controller put in service and serving as an active controller, said first specific media access control address used for an active media access control address when said first local area network controller is said active controller, said second specific media access control address used for said active media access control address when said second local area network controller is said active controller, said terminal comprising;

a first table for registering said specific internet protocol address, said first and said second specific media access control addresses and operation information indicating which said first and said second local area network controllers is put in service, a first broadcasting portion for broadcasting an address notification formed on the basis of registrations of said first table onto said simplex basic local area network when starting is carried out, said address notification including said specific internet protocol address as a source internet protocol address, and said active media access control address as a source media access control address, a replying portion for replying to another address notification transmitted through said simplex basic local area network, said replying portion transmitting a reply including said specific internet protocol address as said source internet protocol address and said active media access control addresses as said source media access control address to a source terminal of the other address notification through said simplex basic local area network, a second table for registering said source internet protocol address and said source media access control address included in each of the other address notification and another reply transmitted through said simplex basic local area network, a registering portion for abstracting said source internet protocol address and said source media access control address from each of the other address notification and the other reply to register them into said second table, a first failure detecting portion for detecting link failure between said active controller and the one of said hubs to which said active controller directly connected, a changing portion for changing said active controller between said fist local area network controller and said second local area network controller and for rewriting said operation information registered in said first table so that said operating controller indicated by said operation information is changed from one to the other of said first and said second local area network controllers when said first failure detecting portion detects said link failure, a second broadcasting portion for broadcasting a changing notification onto said simplex basic local area network when said changing portion changes said active controller, said changing notification including said specific internet protocol address as said source internet address and said active media access control address, and a rewriting portion for rewriting said second table about only said source media access control address in response to another changing notification transmitted through said simplex basic local area network.

7. A terminal as claimed in claim 6 further comprising:

a second failure detecting portion for transmitting a local area network check signal from one of said first and said second local area network controllers to the other of said first and said second local area network controllers through said simplex basic local area network to detect a failure between two hubs directly connected to said first and said second local area network controllers respectively.

8. A terminal as claimed in claim 6 further comprising:

an address check signal transmitting portion for transmitting an address check signal using one of combinations of said source internet protocol address and said source media access control address registered in said second table onto said simplex basic local area network to obtain a response through said simplex basic local area network, a deleting portion for deleting the combination of said source internet protocol address and said source media access control address from said second table when said response is not obtained through said simplex basic local area network by elapse of a predetermined time.

9. A terminal as claimed in claim 6, said hubs connected in a ring and classified into two groups, wherein said first local area network controller is connected to one of hubs belonging one of said groups while said second local area network controller is connected to one of hubs belonging the other of said groups.

10. A terminal as claimed in claim 6, wherein said replying portion compare said source internet protocol address and said source media access control address included in the other address notification with said specific internet protocol address and each of said first and said second media access control addresses, respectively, to transmit a duplicate notification instead of said address notification when said source internet protocol address coincides with said specific internet protocol address or when said source media access control address coincides with one of said first and said second media access control addresses.

11. A method of controlling a path formed in a local area network having a plurality of terminals and a plurality of hubs forming a simplex basic local area network, each of said terminals having first and second local area network controllers and assigned with specific internet protocol address, said first local area network controller directly connected to one of said hubs and assigned with first specific media access control address, said second local area network controller directly connected to another one of said hubs and assigned with second specific media access control address, either of said first local area network controller or said second local area network controller put in service and serving as an active controller, said first specific media access control address used for an active media access control address when said first local area network controller is said active controller, said second specific media access control address used for said active media access control address when said second local area network controller is said active controller, comprising the steps of:

registering, in a first table, said specific internet protocol address, said first and said second specific media access control addresses and operation information indicating which said first and said second local area network controllers is put in service, broadcasting, from a first broadcasting portion, an address notification formed on the basis of registrations of said first table onto said simplex basic local area network when starting is carried out, said address notification including said specific internet protocol address as a source internet protocol address, and said active media access control address as a source media access control address, replying, at a replying portion, to another address notification transmitted through said simplex basic local area network, said replying portion transmitting a reply including said specific internet protocol address as said source internet protocol address and said active media access control addresses as said source media access control address to a source terminal of the other address notification through said simplex basic local area network, abstracting, at a registering portion, abstracting said source internet protocol address and said source media access control address from each of the other address notification and another reply transmitted through said simplex basic local area network, registering, in a second table, said source internet protocol address and said source media access control address abstracted from each of the other address notification and the other reply, detecting, at a first failure detecting portion, link failure between said active controller and the one of said hubs to which said active controller directly connected, changing, at a changing portion, said active controller between said fist local area network controller and said second local area network controller, rewriting, at said changing portion, said operation information registered in said first table so that said operating controller indicated by said operation information is changed from one to the other of said first and said second local area network controllers when said first failure detecting portion detects said link failure, broadcasting, from a second broadcasting portion, a changing notification onto said simplex basic local area network when said changing portion changes said active controller, said changing notification including said specific internet protocol address as said source internet address and said active media access control address, and rewriting, at a rewriting portion, said second table about only said source media access control address in response to another changing notification transmitted through said simplex basic local area network.

12. A program product comprising, computer readable instructions and a recording medium bearing the computer readable instructions; the instructions being adaptable to enable computers to perform a method of controlling a path formed in a local area network having a plurality of terminals and a plurality of hubs forming a simplex basic local area network, each of said terminals having first and second local area network controllers and assigned with specific internet protocol address, said first local area network controller directly connected to one of said hubs and assigned with first specific media access control address, said second local area network controller directly connected to another one of said hubs and assigned with second specific media access control address, either of said first local area network controller or said second local area network controller put in service and serving as an active controller, said first specific media access control address used for an active media access control address when said first local area network controller is said active controller, said second specific media access control address used for said active media access control address when said second local area network controller is said active controller, the method comprising the steps of:

registering, in a first table, said specific internet protocol address, said first and said second specific media access control addresses and operation information indicating which said first and said second local area network controllers is put in service, broadcasting, from a first broadcasting portion, an address notification formed on the basis of registrations of said first table onto said simplex basic local area network when starting is carried out, said address notification including said specific internet protocol address as a source internet protocol address, and said active media access control address as a source media access control address, replying, at a replying portion, to another address notification transmitted through said simplex basic local area network, said replying portion transmitting a reply including said specific internet protocol address as said source internet protocol address and said active media access control addresses as said source media access control address to a source terminal of the other address notification through said simplex basic local area network, abstracting, at a registering portion, abstracting said source internet protocol address and said source media access control address from each of the other address notification and another reply transmitted through said simplex basic local area network, registering, in a second table, said source internet protocol address and said source media access control address abstracted from each of the other address notification and the other reply, detecting, at a first failure detecting portion, link failure between said active controller and the one of said hubs to said active controller directly connected, changing, at a changing portion, said active controller between said fist local area network controller and said second local area network controller, rewriting, at said changing portion, said operation information registered in said first table so that said operating controller indicated by said operation information is changed from one to the other of said first and said second local area network controllers when said first failure detecting portion detects said link failure, broadcasting, from a second broadcasting portion, a changing notification onto said simplex basic local area network when said changing portion changes said active controller, said changing notification including said specific internet protocol address as said source internet address and said active media access control address, and rewriting, at a rewriting portion, said second table about only said source media access control address in response to another changing notification transmitted through said simplex basic local area network.

* * * * *